US006999716B1

(12) United States Patent
Andre et al.

(10) Patent No.: US 6,999,716 B1
(45) Date of Patent: Feb. 14, 2006

(54) DUAL MODE RADIO FREQUENCY RECEPTION DEVICE AND CORRESPONDING MULTIMEDIA RECEIVER

(75) Inventors: Eric Andre, Grenoble (FR); Patrice Senn, Grenoble (FR)

(73) Assignee: Fahrenheit Thermoscope, LLC

( * ) Notice: Subject to any disclaimer, the term of this patent is extended or adjusted under 35 U.S.C. 154(b) by 0 days.

(21) Appl. No.: 09/511,330

(22) Filed: Feb. 23, 2000

(30) Foreign Application Priority Data

Mar. 23, 1999 (FR) .................................. 99 03769

(51) Int. Cl.
*H04H 1/00* (2006.01)
(52) U.S. Cl. ................. 455/3.02; 455/150.1; 455/12.1; 455/562; 455/552; 455/553; 370/316
(58) Field of Classification Search ................. 455/131, 455/150.1, 280, 552, 575, 552.1, 132, 141, 455/562, 12.1, 553, 3.02, 219; 375/257, 375/219; 370/316
See application file for complete search history.

(56) References Cited

U.S. PATENT DOCUMENTS

| 5,584,051 | A | | 12/1996 | Goken |
| 5,689,245 | A | | 11/1997 | Noreen et al. |
| 5,719,573 | A | * | 2/1998 | Leung et al. ................ 341/118 |
| 5,898,680 | A | * | 4/1999 | Johnstone et al. ........... 370/316 |
| 5,907,299 | A | * | 5/1999 | Green et al. ................. 341/143 |
| 5,926,751 | A | * | 7/1999 | Vlahos et al. ............ 455/150.1 |
| 6,078,622 | A | * | 6/2000 | Boytim et al. ............... 375/257 |
| 6,081,691 | A | * | 6/2000 | Renard et al. ............. 455/12.1 |
| 6,097,974 | A | * | 8/2000 | Camp et al. .............. 342/357.1 |
| 6,218,972 | B1 | * | 4/2001 | Groshong .................... 341/143 |
| 6,292,232 | B1 | * | 9/2001 | Oyagi ......................... 348/725 |

FOREIGN PATENT DOCUMENTS

| EP | 816 803 | 1/1998 |
| WO | 98 34210 | 8/1998 |

OTHER PUBLICATIONS

A Si BJT IF Downconverter/AGC IC for DAB; Goldfarb et al; 1998 IEEE Radio Frequency Integrated Circuits Symposium; pp. 305-308.
ISSCC98/Session 8/Wireless receivers/paper FA 8.1; A 115mWCMOS GPS Receiver; Shaeffer et al.; 1998 IEEE International Solid-State Circuits Conference; pp. 122, 123, 424.
A SI BJT RF Dual Band Receiver IC for DAB; Titus et al.; 1998 IEEE Radio Frequency Integrated Circuits Symposium; pp. 297, 298, 300.
D-FIRE: A DAB Receiver System on a Chip; Bolle et al.; Robert Bosch GmbH, Hildesheim; pp. 360-362.

(Continued)

Primary Examiner—Joseph Feild
Assistant Examiner—Wayne Cai
(74) Attorney, Agent, or Firm—Meyertons Hood Kivlin Kowert & Goetzel, P.C.; B. Noël Kivlin

(57) ABSTRACT

The invention relates to a dual mode radio frequency reception device of the type enabling the reception firstly of multi-carrier broadcast signals in a first frequency band and secondly radio positioning signals in a second frequency band, comprising a single preprocessing module (21), particularly including a pass-band antenna filter (211) in which the pass-band includes at least the said first and second frequency bands, and outputting firstly to a first processing system (22) to process the said multi-carrier broadcast signals, and secondly to a second processing system (23) to process the said radio positioning signals.

10 Claims, 2 Drawing Sheets

OTHER PUBLICATIONS

A Low-Power, Low-Cost Bipolar GPS Receiver Chip; Murphy et al.; IEEE Journal of Solid-State Circuits, vol. 32, No. 4, Apr. 1997, pp. 587-591.

A 1.57-GHz RF Front-End for Triple Conversion GPS Receiver; Piazza et al.; IEEE Journal of Solid-State Circuits, vol. 33, No. 2, Feb. 1998; pp. 202-209.

* cited by examiner

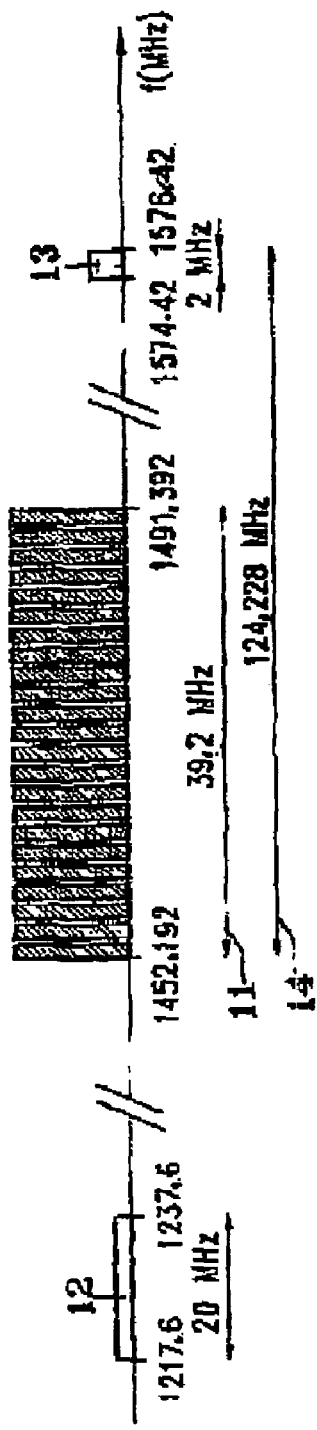
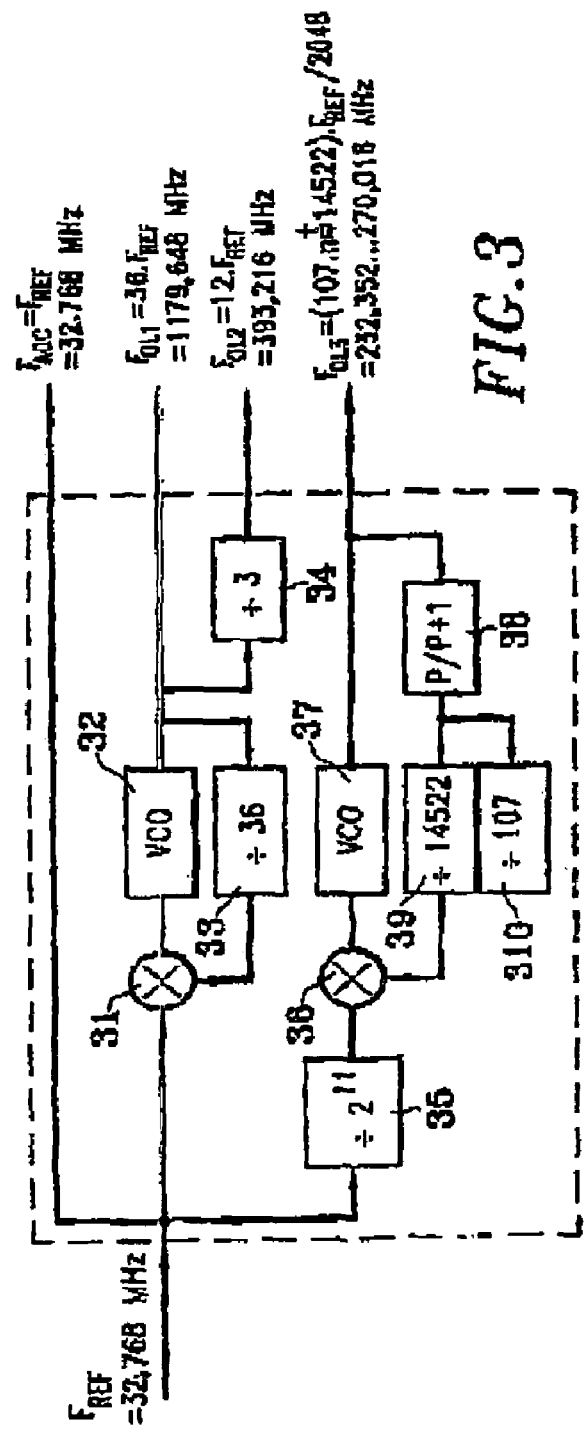

DUAL MODE RADIO FREQUENCY RECEPTION DEVICE AND CORRESPONDING MULTIMEDIA RECEIVER

The domain of this invention is multimedia receivers, and particularly portable receivers. More precisely, the invention relates to receivers capable of receiving firstly multi-carrier broadcast signals, and secondly radio positioning signals.

This type of multimedia receiver has been developed particularly within the framework of the European MEDEA A222 "Components for portable multimedia systems" project. This type of receiver is planned to include firstly DAB (Digital Audio Broadcasting) signal reception means, and secondly GPS (Global Positioning System) signal reception means.

The DAB system is a digital data broadcasting system, the first purpose of which was to replace the current FM radio. One of the objectives was then to offer improved sound quality, referred to as "digital" and accompanied by text information.

The DAB system uses COFDM modulation. According to the standard currently used, its spectrum occupies 23 channels distributed on a 39.2 MHz frequency band. The width of a DAB channel is 1.536 MHz, and the spacing between channels is 176 kHz. The reception level varies between –90 dBm and +8 dBm.

Each DAB channel is surrounded by adjacent channels, the level of which may be 40 dB above the useful channel, or even 70 dB for remote channels (I/C=40 dB to 70 dB). The range of the input signal, and the presence of adjacent channels, make the use of controlled gain amplifiers (CGA) and selective filters necessary. An analog-digital converter with a sufficiently wide range could reduce the constraints on the first two parameters through the use of digital filters and CGAs that are easier to make. The receiver must be sufficiently selective to extract the useful signal, and the range must be sufficiently wide to accept variations in the reception signal.

In particular, the following documents describe examples of DAB receivers:
- Ward Titus, Rosa Croughwell, Chris Schiller, Larry DeVito, "A Si BJT Dual Band Receiver IC for DAB", Radio Frequency Integrated Circuits Symposium, 1998, pp. 297–300;
- Marc Goldfarb, Rosa Croughwell, Chris Schiller, Darell Livezey, George Heiter, "A Si BJT IF Down Converter/AGC IC for DAB", Radio Frequency Integrated Circuits Symposium, 1998, pp. 305–308;
- M. Bolle, K. Gieske, F. Hoffmann, T. Mlasko, G. Spreitz, "D-FIRE: A DAB Receiver System on a Chip", Proceedings of ESSCIRC'98, 1998, pp. 360–363.

A DAB receiver can receive audio, video and/or text type data, such that it performs the functions of a multimedia terminal.

The addition of other services such as the GPS system makes it possible to develop other interesting applications.

Thus, reception of a GPS signal in order to precisely determine the location of the receiver, is a means of directly developing navigation assistance applications, with the multimedia terminal informing the user of his position on a geographic map downloaded through the DAB channel. Within the framework of an automobile application, the DAB broadcast can provide information about traffic jams and accidents. Positioning using GPS is a means of determining a new route.

It should be noted that the GPS signal uses spectrum spreading modulation.

Two types of GPS signals are emitted on two channels at different frequencies, L1=1575.42 MHz and L2=1227.6 MHz. The L2 channel broadcasts a signal used for military purposes (P code) and occupies a 20 MHz band. The L1 channel emits a signal for civil applications (C/A code) that occupies a 2 MHz band.

Therefore, multimedia receivers only use this L1 channel. The reception level of the GPS signal for this channel is about –130 dBm, which is 19 dB below the thermal noise (about –111 dBm on a 2 MHz band).

After correlating the GPS signal with the spreading sequence (despreading), the GPS signal occupies a 50 Hz band with a 43 dB gain. Since the correlation operation is made within the digital range, the analog-digital conversion is not a very sensitive point. In general, a single 1-bit ADC is used in order to eliminate the need for a controlled gain amplifier (CGA).

The overriding problem is the noise level added in the band after quantification of the signal. If a single 1-bit quantifier is used, the range of its input signal must be sufficiently low so that the quantification noise is not too high. This aspect requires appropriate filtering of disturbing sources and/or oversampling of the very low level signal, and a high gain (about 100 dB) so that the ADC can process the GPS signal level.

The following documents describe examples of GPS receivers:
- Anna M. Murphy, Shinichi Tsutsumi, Peter Gaussen, "A Low Power, Low-Cost Bipolar GPS Receiver Chip", IEEE Journal of Solid-State Circuits, vol. 32, No. 4, April 1997, pp. 587–591;
- Arvin R. Shahani, Derek K., Shaeffer, Thomas H. Lee, "A 12-mW Wide Dynamic Range CMOS Front-End for a Portable GPS Receiver", IEEE Journal of Solid State Circuits, vol. 32, No. 12, December 1997, pp. 2061–2070;
- Francesco Piazza, Qiuting, Huang, A 1.75-GHz RF Front-End for Triple Conversion GPS Receiver", IEEE Journal of Solid-State Circuits, vol. 33, No. 2, February 1998, pp. 202–209;
- D. Shaeffer, A. Shahani, S. Mohan, H. Samavati, H. Rategh, M. Hershenson, M. Xu, C. Yue, D. Eddleman, T. Lee, "A 115 mW CMOS GPS Receiver", Proceedings of ISSCC'98, Session 8, February 1998, pp. 122–123.

At the present time in known multimedia reicevers, each proposed service (DAB and GPS) has its own radio frequency reception system. Therefore two radio frequency reception systems are simply placed side by side in the same casing, possibly sharing a common power supply. Obviously, this means increased complexity and consumption.

In particular, the purpose of the invention is to overcome this disadvantage in prior art.

More precisely, one purpose of the invention is to provide a dual mode reception device enabling reception firstly of multi-carrier broadcast signals (for example DAB) and secondly radio positioning signals (for example GPS) under optimum conditions, particularly for consumption, size and complexity of the means used.

Thus, one particular purpose of the invention is to provide this type of device that has a sufficiently low consumption so that it can be implemented in the form of a portable multimedia receiver.

Obviously, another purpose of the invention is to provide such a reception device at a low cost price compared with known receivers, as a result of its lower technical complexity.

Another purpose of the invention is to provide this type of reception device with good reception qualities despite the cohabitation of two radio frequency systems.

These purposes, and others that will become clear later, are achieved using a dual mode radio frequency reception device of the type enabling reception firstly of multi-carrier broadcast signals in a first frequency band, and secondly radio positioning signals in a second frequency band.

According to the invention, this device comprises a single preprocessing module, particularly including a pass-band antenna filter in which the pass-band includes at least the said first and second frequency bands, and outputting firstly to a first processing system for the said multi-carrier broadcast signals, and secondly to a second system for processing the said radio positioning signals.

Therefore, the invention is based on sharing some resources (preprocessing) which obviously leads to a reduction in the cost, size and complexity, and electricity consumption. Therefore, this enables high integration of the receiver on silicon.

Therefore, the invention proposes an innovative radio frequency architecture that can include the reception of DAB and GPS signals, for example about 1.5 GHz, advantageously up to the generation of the I and Q digital channels.

Thus, the said single preprocessing module also advantageously comprises at least one of the elements belonging to the group comprising:

a first low noise amplifier;
a first transposition stage to a first intermediate frequency, by multiplying by a first transposition frequency;
a second amplifier.

In other words, the invention offers a major saving by offering resource sharing (particularly the first transposition stage).

Still with the objective of reducing the complexity, the invention proposes optimized implementation of the different frequencies used.

Thus, preferably a single analog-digital conversion frequency is implemented to control the first digitization means in the first processing system, and the second digitization means in the second reception system.

For example, the said first digitization means may include a delta-sigma pass-band modulator. The second digitization means may comprise a "1-bit" quantifier.

Preferably, the reception device according to the invention also comprises a frequency synthesizer outputting to the said first and second processing systems, capable of generating, at least two of the frequencies belonging to the group comprising:

the said first transposition frequency;
the said analog-digital conversion frequency,
a second transposition frequency (first system) used by a second transposition stage to a second intermediate frequency included in the said first processing system;
a second transposition frequency (second system) used by a second transposition stage to a second intermediate frequency included in the said second processing system.

As described in the preamble, and without being restrictive, the said first processing system can advantageously be used for the reception of DAB signals and the said second processing system for the reception of GPS signals.

For example, the said first frequency band may be between about 1452.192 MHz and 1491.392 MHz, and the said second frequency band may be between about 1574.42 MHz and 1576.42 MHz.

The reception device according to the invention can be used for applications in many domains. For example, it can be put into a "car radio/radio navigation" unit for a car. Due to its low consumption, it can also very advantageously be used in portable multimedia receivers. One advantageous application for this type of device could be cooperation between broadcasting of geographic maps by the DAB system and precise positioning on these maps by the GPS system.

Other characteristics and advantages of the invention will become clearer after reading the following description of a particular embodiment of the invention given simply as illustrative and non-restrictive examples, and the attached figures in which:

FIG. 1 shows the frequency of the DAB and GPS channels used by a dual mode receiver according to the invention;

FIG. 3 shows a block diagram illustrating an advantageous technique for synthesizing frequencies for the receiver in FIG. 2.

Figure 2:
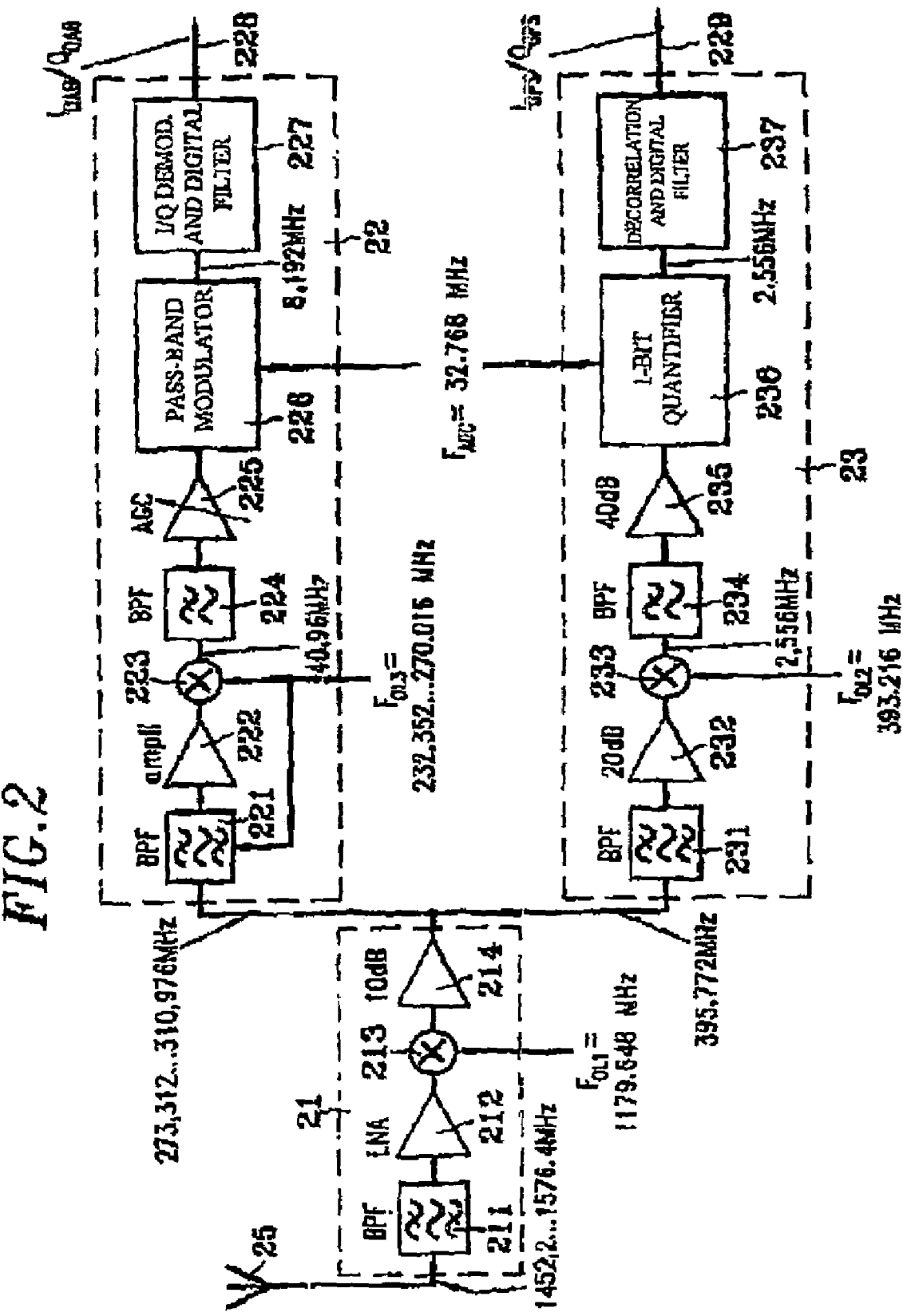
FIG. 2 is a block diagram showing an embodiment of a receiver according to the invention designed to receive and process the signals in FIG. 1.

As described above, the proposed radio frequency architecture according to the invention takes account of the proximity of reception frequencies of the DAB and GPS signals to optimize the receiver. FIG. 1 illustrates the frequency distribution of these signals.

The DAB signals (L band) are organized into 23 channels and are distributed on a 39.2 MHz band 11 between 1452.192 MHz and 1491.392 MHz.

The GPS system is based on two channels:

a GPS1 channel 12 covering a 20 MHz band between 1217.6 MHz and 1237.6 MHz, corresponding to the P code;
a GPS2 channel 13, with a 2 MHz frequency band between 1574.42 MHz and 1576.42 MHz. This is the L1 channel corresponding to the C/A code.

The receiver according to the invention only processes the L1 channel 13, for GPS aspects. Consequently, the receiver according to the invention must cover at least the frequency band 14 with a band width of 124.228 MHz extending from 1452.192 MHz to 1576.42 MHz, so as to encompass the 23 DAB channels and the GPS2 channel (L1).

Unlike known systems, the DAB/GPS dual mode architecture according to the invention can reduce the complexity and consumption of the radio frequency receiver by sharing hardware resources, as can be seen clearly in FIG. 2.

The receiver can be broken down into three main modules:

a pre-processing or "input" module 21 of the radio frequency receiver which is common to the DAB and GPS channels;
a specific DAB processing module 22;
a specific GPS processing module 23.

Note that although these two processing modules 22 and 23 are independent, they preferably use the same frequencies, or frequencies output from the same frequencies synthesizer, as will become clearer in the following.

Therefore the input 21 of the radio frequency receiver is common to the DAB and GPS channels. In particular it comprises:

an antenna filter 211;
a low noise amplifier (LNA), which is easier to manufacture than known systems that require narrower bands due to the low quality factor (wide band);
a first intermediate frequency transposition stage 213 controlled by a frequency $F_{OL1}$=1179.648 MHz;
a gain stage 214.

The two channels are processed independently to enable simultaneous reception of the DAB and GPS signals. In other words, the signal 215 output by the gain stage 214 is input into processing modules 22 and 23 simultaneously.

For the DAB channel, the processing module 22 comprises means of transposition to a second intermediate frequency comprising a filter 221, an amplifier 222 and a mixer 223. The frequency $F_{OL3}$ controlling the filter 221 and the mixer 222 is between 232, 352 and 270.016 MHz depending on which DAB channel is selected. The signal obtained at the output is centered on 40.96 MHz. It is input to a filter 224 and then a controlled gain amplifier (CGA) 225. A $\Delta\Sigma$ pass-band modulator 226 sub-samples the signal before digitizing it and then generating the digital I and Q channels. I/Q demodulation and digital filtering means 227 output data 228 on the I and Q channels.

The GPS processing module 23 comprises a filter 231 centered on 395.772 MHz followed by a 20 dB amplifier 232 and a second intermediate frequency transposition stage 233 controlled by frequency $F_{OL2}$=393.216 MHz. An LPF filter 234 and then a 40 dB amplifier 235 is input into a 1-bit quantifier 236 that eliminates the need for a controlled gain amplifier. A digital decorrelation and filter module 237 outputs the GPS signals 229 onto the I and Q channels.

The structure of this dual mode receiver also has the advantage that it can share the same frequency synthesizer illustrated in FIG. 3. With this technique, the number of frequencies to be generated is reduced by two thirds.

The following frequencies are obtained starting from a reference frequency $F_{REF}$=32.768 MHz:

$F_{ADC}$=$F_{REF}$=32.768 MHz, which is input firstly to the $\Delta\Sigma$ modulator 226 in the DAB processing module, and secondly to the 1-bit quantifier 236 of the GPS processing module;
the frequency $F_{OL1}$=36.$F_{REF}$=1 179.648 MHz, controlling the first transposition stage 213;
the frequency $F_{OL2}$=12. $F_{REF}$=393.216 MHz, controlling the second transposition stage 233 of the GPS processing module;
the frequency $F_{OL3}$=(107.n+14 522).$F_{REF}$/2 048=232.352 . . . 270.016 MHz, controlling the second transposition stage 223 of the DAB processing module (where n varies from 0 to 22 depending on which DAB channel is selected).

These various frequencies can be obtained because the frequency synthesis module comprises a transposition multiplier 31 that outputs into a voltage controlled oscillator (VCO) 32, and is controlled by a frequency divider by 36 (33). The signal output from oscillator 32 provides the frequency $F_{OL1}$, and outputs it into the divider by 36 (33). The frequency $F_{OL1}$ is also divided by 3 (divider 34) to obtain the frequency $F_{OL2}$. Furthermore, frequency $F_{REF}$ is output into a divider by 2048 (=$2^{11}$) module 35 that outputs into a transposition multiplier 36 that outputs the frequency $F_{OL3}$ through a voltage controlled oscillator (VCO) (37). This frequency is looped back onto a P/P+1 module (38) (corresponding to selection of the DAB channel that is simultaneously input to a divider by 14 522 (39) and a divider by 107 (310) that control the transposition multiplier 36).

Thus the invention proposes a radio frequency architecture optimized for the reception of DAB and GPS signals. In particular, it enables the manufacture of portable multimedia receivers and, for example, can be used in applications providing assistance for individual navigation, to show a person his position (GPS) on a downloaded map (DAB).

The reduction in cost and consumption of this type of terminal makes it possible to consider large scale integration of the receiver on silicon. Dual mode reception is optimized due to sharing of hardware and frequency resources, largely because the reception frequencies of the GPS and DAB channels (in the L band) are close together.

The invention claimed is:

1. Dual mode radio frequency reception device of the type enabling simultaneous reception firstly of multi-carrier digital audio broadcast (DAB) signals in a first frequency band (11), and secondly, radio global positioning signals (GPS) in a second frequency band (12), (13), the device comprising a single preprocessing module (21), including a pass-band antenna filter (211) in which the pass-band includes at least said first and said second frequency bands, simultaneously outputting firstly to a first processing system (22) for processing the multi-carrier digital audio broadcast (DAB), and secondly to a second processing system (23) for processing the said radio global positioning signals (GPS), and simultaneously displaying the processed multi-carrier digital audio broadcast (DAB) signals and the processed radio global positioning signals (GPS).

2. Device according to claim 1, characterized in that said single preprocessing module (21) also comprises at least one of the elements belonging to the group comprising:
a first low noise amplifier (212);
a first transposition stage (213) to a first intermediate frequency, by multiplying by a first transposition frequency;
a second amplifier (214).

3. Device according to claim 2, characterized in that said first processing system (22) comprises first digitization means (226) and said second processing system comprises second digitization means (236), said first and said second digitization means being controlled by the same analog-digital conversion frequency.

4. Device according to claim 3, characterized in that said first digitization means (226) include a delta-sigma pass-band modulator.

5. Device according to claim 3, characterized in that said second digitization means (236) include a "1-bit" quantifier.

6. Device according to claim 3, characterized in that the device also comprises a frequency synthesizer (31 to 31 a) outputting into said first and said second processing systems, capable of generating at least two frequencies belonging to the group comprising:
said first transposition frequency;
said analog-digital conversion frequency,
a second transposition frequency used by a second transposition stage to a second intermediate frequency included in said first processing system;
a second transposition frequency used by a second transposition stage to a second intermediate frequency included in said second processing system.

7. Device according to claim 1, characterized in that said first frequency band is between about 1452.192 MHz and 1491.392 MHz, and in that said second frequency band is between 1574.42 MHz and 1576.42 MHz.

8. Portable multimedia receiver, characterized in that it comprises a dual mode radio frequency reception device according to claim 1.

9. Dual mode radio frequency reception device of a type enabling simultaneous reception firstly of multi-carrier broadcast signals in a first frequency band, and secondly, radio positioning signals in a second frequency band, the device comprising a single preprocessing module, including a pass-band antenna filter in which the pass-band includes at least the first and second frequency bands, simultaneously outputting firstly to a first processing system for processing the multi-carrier broadcast signals, and secondly to a second processing system for processing the radio positioning signals, and simultaneously displaying the processed multi-carrier broadcast signals and the processed radio positioning signals.

10. Device according to claim 9, characterized in that said first processing system (22) is used for the reception of DAB signals and in that the second processing system (23) is used for the reception of GPS signals.

\* \* \* \* \*